US009560912B1

(12) United States Patent
Chin

(10) Patent No.: US 9,560,912 B1
(45) Date of Patent: Feb. 7, 2017

(54) BOX STAND

(71) Applicant: Anhua Chin, Rancho Cucamonga, CA (US)

(72) Inventor: Anhua Chin, Rancho Cucamonga, CA (US)

( * ) Notice: Subject to any disclaimer, the term of this patent is extended or adjusted under 35 U.S.C. 154(b) by 0 days.

(21) Appl. No.: 14/987,196

(22) Filed: Jan. 4, 2016

(51) Int. Cl.
*A47B 91/00* (2006.01)
*A47B 23/04* (2006.01)

(52) U.S. Cl.
CPC .......... *A47B 23/04* (2013.01); *A47B 2023/049* (2013.01)

(58) Field of Classification Search
CPC ...... A47B 23/04; A47B 23/042; F16M 11/041
USPC  248/450, 441.1, 346.01, 346.03; 361/679.41
See application file for complete search history.

(56) References Cited

U.S. PATENT DOCUMENTS

| 7,969,732 | B1 * | 6/2011 | Noble | F16M 11/041 |
| | | | | 248/917 |
| D668,662 | S * | 10/2012 | Suiter | D14/447 |
| D730,090 | S * | 5/2015 | Christal | D6/675.3 |
| 9,211,001 | B2 * | 12/2015 | Negretti | A47B 23/04 |
| 9,338,903 | B1 * | 5/2016 | Loscalzo | A47B 23/042 |
| 2013/0134282 | A1 * | 5/2013 | Negretti | A47B 23/04 |
| | | | | 248/450 |
| 2014/0185262 | A1 * | 7/2014 | Hashimoto | F16M 13/00 |
| | | | | 361/809 |

* cited by examiner

Primary Examiner — Todd M Epps
(74) Attorney, Agent, or Firm — Clement Cheng

(57) ABSTRACT

A box stand has an upper chamber with an upper chamber hollow. The upper chamber is hollow having a first upper chamber face and a second upper chamber face as well as an upper chamber front face and a pair of upper chamber side faces. A lower chamber has a lower chamber hollow. The lower chamber has a closed position and an open position. The lower chamber is at least partially detached from the upper chamber in the open position. The lower chamber is rigidly attached to the upper chamber in the closed position. The lower chamber hollow has a pair of lower chamber side faces as well as a lower chamber front face. A first side interface is formed between the upper chamber and the lower chamber.

7 Claims, 9 Drawing Sheets

BOX STAND

FIELD OF THE INVENTION

The present invention is in the field of stands for electronic equipment.

DISCUSSION OF RELATED ART

A variety of different personal electronic stands have been devised for allowing personal electronic equipment to be displayed at an angle. Personal electronics miniaturization has allowed popularity for personal electronic devices since their introduction into the market. Cell phone and tablet stands are a common accessory used with a variety of different personal electronics. For example, tablet stands allow a user to place his/her tablet in an upright position, thus allowing for more efficient and comfortable use of the tablet. Some tablet stands allow for the tablet to be held at more than one upright angle. U.S. Pat. No. 5,607,135 by inventor Hiroshi Yamada entitled Tablet Stand, issued Mar. 4, 1997, the disclosure of which is incorporated herein by reference, is a foldable one-piece tablet stand with three fastening concave parts that allow for the tablet to be supported at three separate angles. The back rest of the stand includes two supporting legs with fastening claws that are fastened to the concave parts of the grounding section of the stand.

Stands may also be used for cell phones. For example, U.S. Pat. No. 8,303,126 by inventor Randall Moya, Jr., entitled Cell Phone Stand, issued Nov. 6, 2012, the disclosure of which is incorporated herein by reference, is a cell phone stand used to secure a cell phone with video recording capability in an upright position. The stand includes a built-in light system that provides illumination for recording in areas with poor lighting. The stand is also collapsible and easily portable. A similar concept is presented in United States Patent Publication Number CN202647101 U by inventors Jiang Xufeng, Huang Jiaxi, and Ke Chenggang entitled Tablet Personal Computer Support with Lighting Device, issued Jan. 2nd, 2013, the disclosure of which is incorporated herein by reference. This invention provides a tablet stand with a lighting device that provides illumination for use of the tablet in poorly lit environments. The tablet also provides a charging function that allows that tablet to be used while charging.

U.S. Pat. No. 9,025,327 by inventor Hiriyuki Noguchi et al., entitled Portable Tablet Folio Stand, published May 5, 2015, the disclosure of which is incorporated herein by reference, provides a tablet stand with a keyboard. The invention provides a device with a portable and detachable wireless keyboard and a stand that allows for flexible use and operation of a tablet. U.S. Pat. No. 8,833,716 by inventor Joe Funk and Shaun C. Lindblad, entitled Tablet Mounting Systems and Methods, issued Sep. 16, 2014, the disclosure of which is incorporated herein by reference, is a tablet mounting system with four engagement arms that form a clamping mechanism to release or support a tablet. The mounting system provides an interface for attaching the tablet to a support object, such as a computer monitor.

SUMMARY OF THE INVENTION

A box stand has an upper chamber with an upper chamber hollow. The upper chamber is hollow having a first upper chamber face and a second upper chamber face as well as an upper chamber front face and a pair of upper chamber side faces. A lower chamber has a lower chamber hollow. The lower chamber has a closed position and an open position. The lower chamber is at least partially detached from the upper chamber in the open position. The lower chamber is rigidly attached to the upper chamber in the closed position. The lower chamber hollow has a pair of lower chamber side faces as well as a lower chamber front face. A first side interface is formed between the upper chamber and the lower chamber.

A second side interface is formed between the upper chamber and the lower chamber. The second side interface opposes the first side interface. A lower chamber slot is formed on the lower chamber. The lower chamber slot forms a lower chamber slot edge where the lower chamber slot is contiguous with the lower chamber hollow. The lower chamber slot edge is a planar edge of the lower chamber sidewall. A first lower chamber face is formed on a lower surface of the lower chamber when the lower chamber is in closed position. A chamber hinge connects the upper chamber to the lower chamber.

The second lower chamber face is formed opposite the first lower chamber face. The lower chamber slot bisects the first lower chamber face and the second lower chamber face. An upper chamber slot is formed on an upper portion of the upper chamber. The upper chamber slot forms an upper chamber slot edge where the upper chamber slot is contiguous with the upper chamber hollow. The upper chamber has an upper chamber opening form on an opposite side of the lower chamber. The upper chamber opening is wider than an upper chamber slot. The upper chamber opening is contiguous with the upper chamber slot.

The upper chamber releasably connects with the lower chamber at a hinged connection. An interface indent ridge formed on an interface indent formed on the lower edge of the upper chamber abuts with an interface protrusion formed on an upper edge of the lower chamber.

The lower chamber opening has a rectangular or square shape that is contiguous with the lower chamber slot. The lower chamber opening is wider than the lower chamber slot to form a lower chamber slot corner. The lower chamber slot is contiguous with the lower chamber opening.

Figure 1:
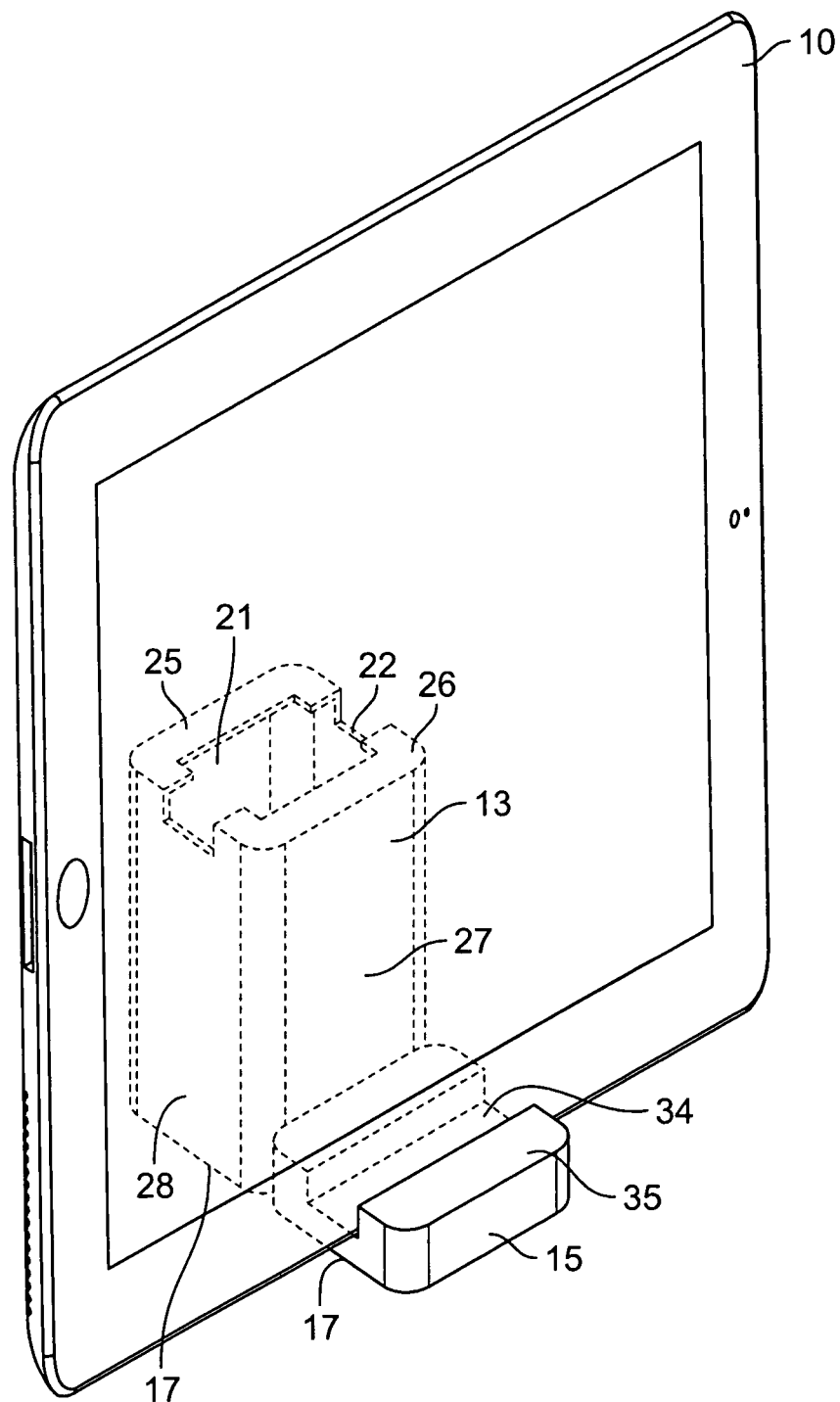
FIG. 1 is a perspective view of the present invention stand in deployed position holding a tablet computer.
Figure 2:
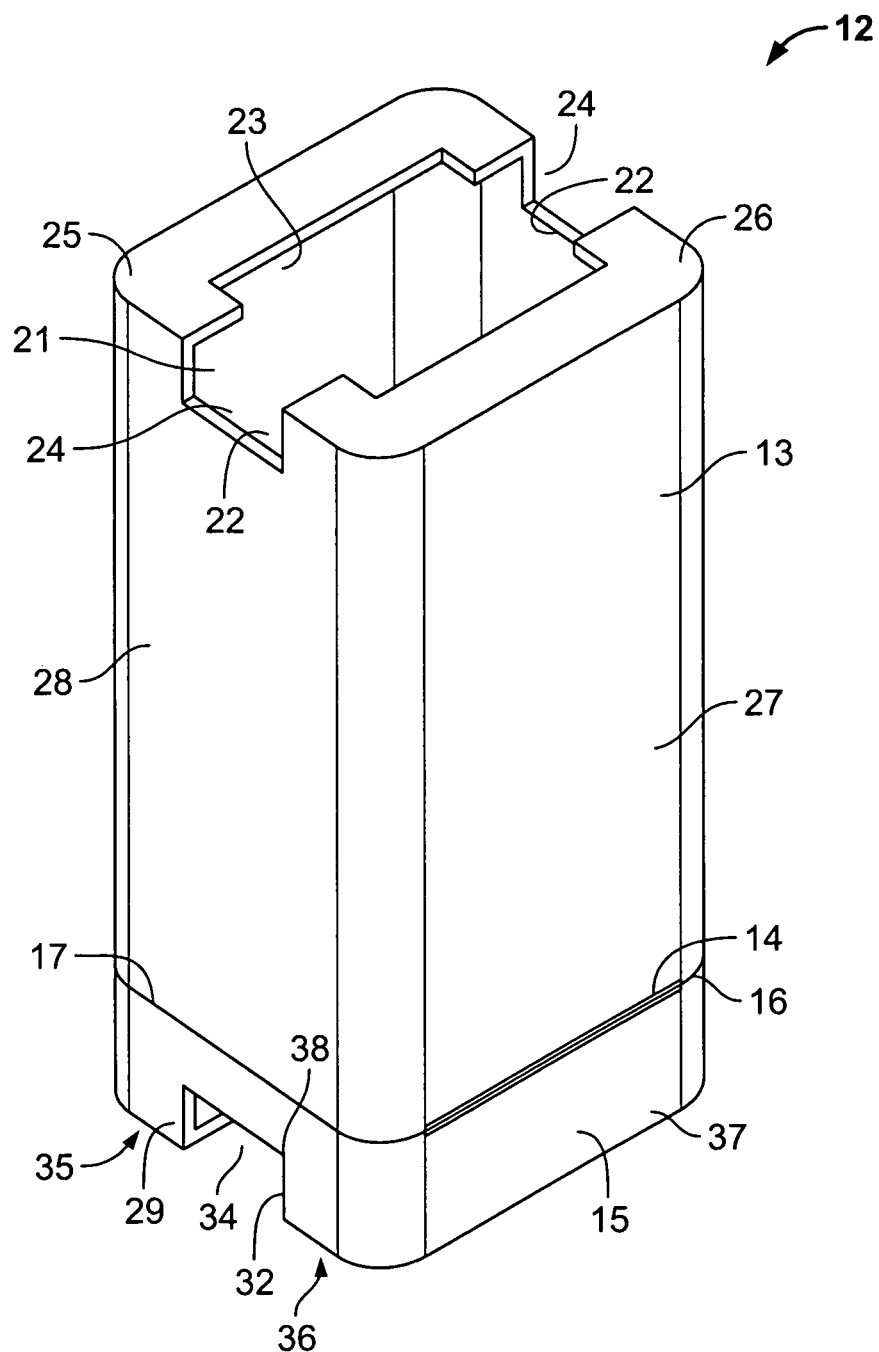
FIG. 2 is a perspective view of the present invention stand in stowed position.

The following callout list of elements can be a useful guide in referencing the elements of the drawings.
10 Tablet
11 Laptop
12 Stand
13 Upper Chamber
14 Chamber Hinge
15 Lower Chamber
16 First Side Interface
17 Second Side Interface
21 Upper Chamber Hollow
22 Upper Chamber Slot Edge
23 Upper Chamber Opening
24 Upper Chamber Slot
25 First Upper Chamber Face
26 Second Upper Chamber Face
27 Upper Chamber Front Face
28 Upper Chamber Side Face
29 Lower Chamber Side Face
31 Lower Chamber Hollow
32 Lower Chamber Slot Edge
34 Lower Chamber Slot
35 First Lower Chamber Face
36 Second Lower Chamber Face
37 Lower Chamber Front Face
38 Lower Chamber Slot Corner
41 Interface Indent
42 Interface Indent Ridge
43 Interface Protrusion

DETAILED DESCRIPTION OF THE PREFERRED EMBODIMENT

The present invention is a three in one container which is: first a container for a power supply, second that also acts as a spool to hold a power cable, and third unfolds to become a stand for a personal electronic device. A stand 12 supports a mobile device such as a cell phone, laptop 11 or tablet 10. The stand 12 includes an upper chamber 13 and a lower chamber 15 connected at a chamber hinge 14. The upper chamber 13 and the lower chamber 15 meet with each other along a lower edge of the upper chamber 13 and an upper edge of the lower chamber 15. The pair of chambers form an interface in closed position and the pair of chambers can rotate relative to each other to an open position were the lower chamber 15 rotates 180°. The interface between the upper chamber 13 and the lower chamber 15 includes a first side interface 16 and a second side interface 17. The pair of side interfaces is flat for providing a base to support both chambers in the open position. In the closed position, the interface can snap closed to prevent opening without overcoming the snap bias. The open position is a deployed position and the closed position is a retracted position.

The upper chamber front face 27 is preferably flat and faces the lower chamber front face 37 when the device is in open position. The upper chamber front face 27 is preferably parallel to the lower chamber front face 37 when the device is in closed position. The upper chamber front face 27 can be contiguous with the lower chamber front face 37 for example if both surfaces are connected together with a graphical imprinted sticker or other covering layer.

The upper chamber as an upper chamber opening 23 and the lower chamber has a lower chamber opening opposing the upper chamber opening 23. The upper chamber 13 also includes an upper chamber slot 24 that passes across an upper chamber hollow 21. The upper chamber slot defines an upper chamber slot edge 22 shaped for receiving a power cord. The upper chamber opening 23 is preferably wider than the upper chamber slot 24. The second upper chamber face 26 is parallel to the first upper chamber face 25. The upper chamber slot 24 separates the first upper chamber face 25 from the second upper chamber face 26. The first upper chamber face 25 is preferably U-shaped and a mirror image of the second upper chamber face 26. The upper chamber opening 23 can be a square shaped opening or rectangular shaped opening wider than the upper chamber slot 24. The upper chamber opening 23 can provide a finger access opening for a user to access the upper chamber hollow 21.

The upper chamber and the lower chamber are both preferably formed as generally rectangular prism members with rounded edges. The upper chamber front face 27 is orthogonal to both upper chamber side faces 28. The upper chamber side face 28 is bounded between the second side interface 17 and the upper chamber slot 24. Similarly, the lower chamber 15 has a lower chamber front face 37 that is parallel to the chamber hinge 14 and of the lower chamber slot 34. The lower chamber slot 34 also forms a lower chamber slot edge 32 along the lower chamber hollow 31.

The lower chamber slot edge 32 extends in a U-shape along the second lower chamber face 36, and making a right angle turn at the lower chamber slot corner 38 across the lower chamber slot 34 and then along the lower chamber side face 29. The lower chamber side face 29 is also U-shaped and accommodates a lower chamber slot 34 which provides access to the lower chamber hollow. The first lower chamber face 35 is parallel to the second lower chamber face 36. The first lower chamber face and the second lower chamber face initially face downward in the closed position and then rotate to face upward in a deployed position. The lower chamber slot 34 receives a lower edge of a tablet computer 10 and the tablet computer rests against the upper chamber front face 27. The lower chamber side face 29 is notched with the lower chamber slot 34 sized to allow a power supply prong to protrude from the lower chamber slot 34. The lower chamber slot 34 also can receive a power cable wrapped around the lower chamber slot 34 and the upper chamber slot 24. A user can insert and remove the power supply from the chamber cavities when the power cable is unwrapped from the pair of slots. The pair of slots can be angled like a spool or can be orthogonal like a reel as shown in the drawings.

Figure 3:
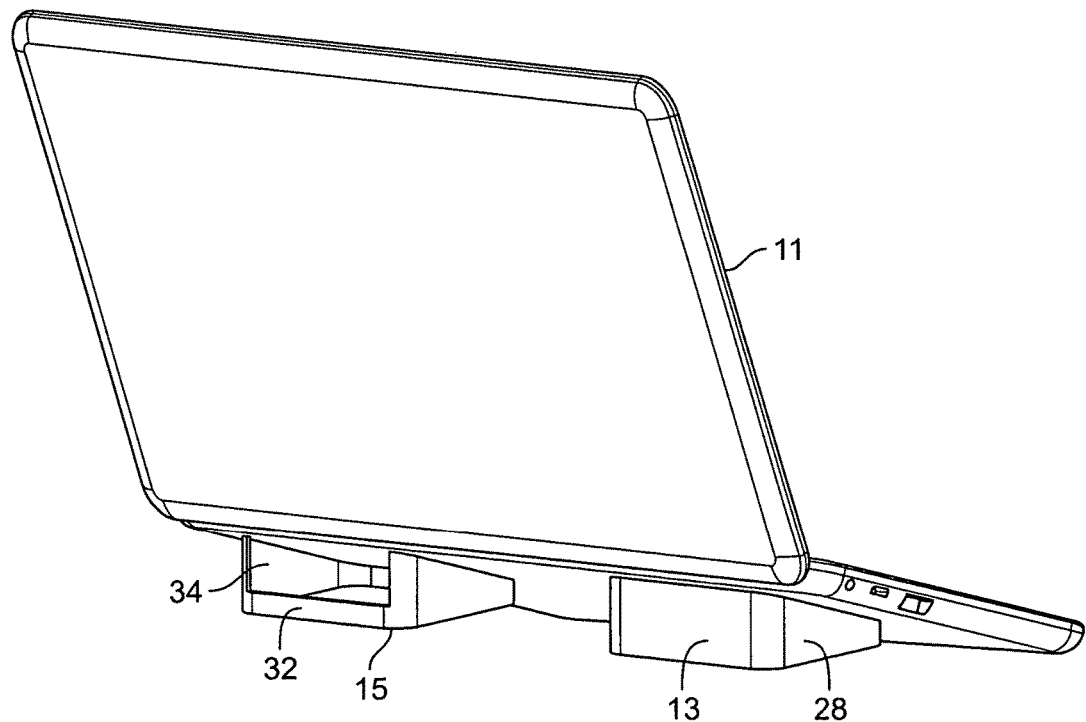
FIG. 3 is a perspective view of the present invention stand in deployed position supporting a laptop computer.
Figure 4:
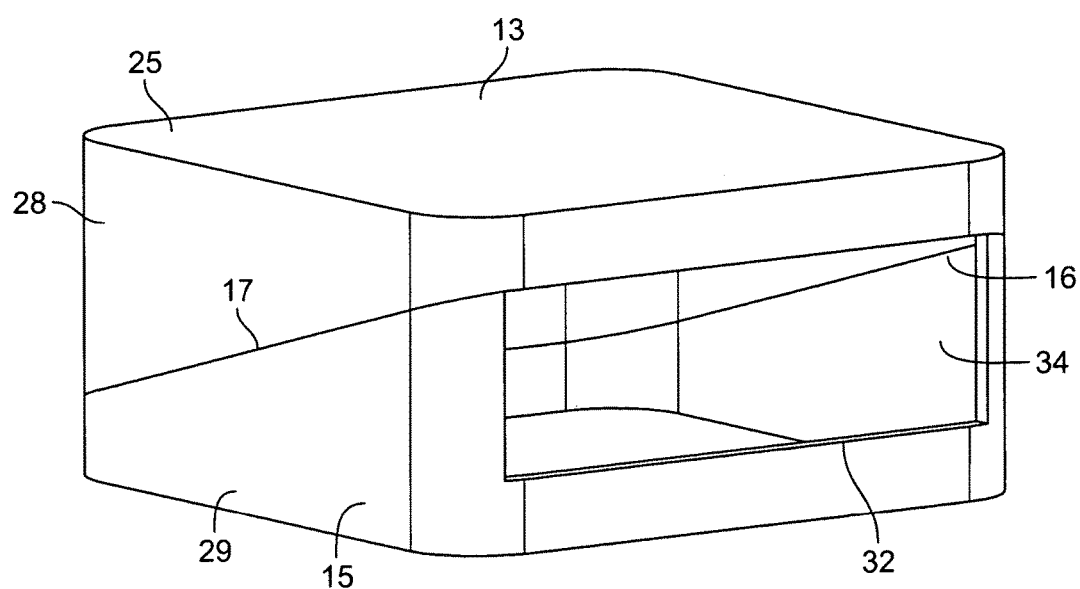
FIG. 4 is a perspective view of the present invention stand in a stowed position.
Figure 5:
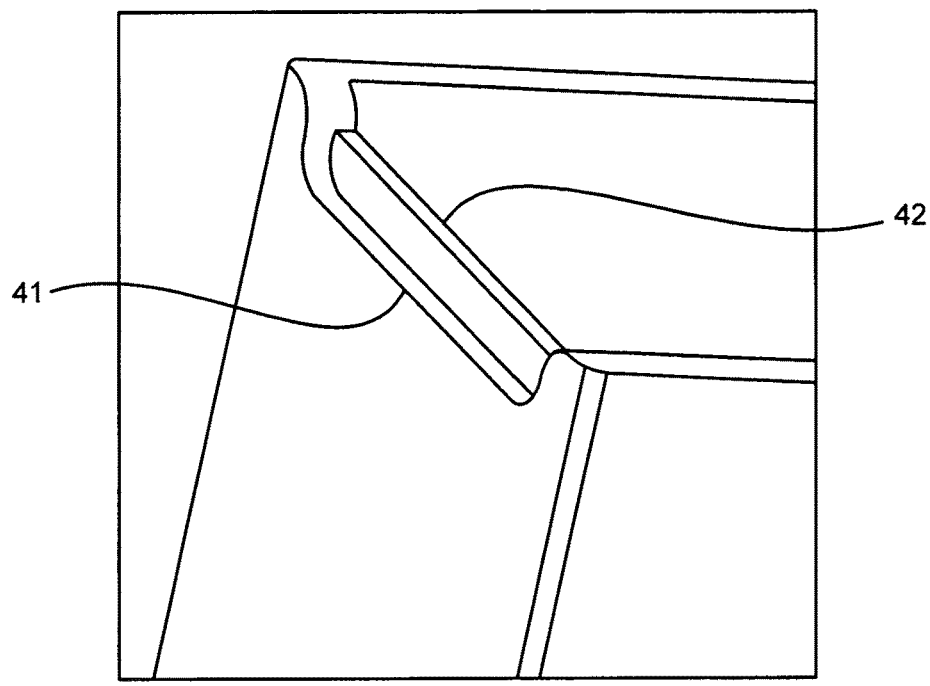
FIG. 5 is a detailed bottom rear perspective view of FIG. 1.
Figure 6:
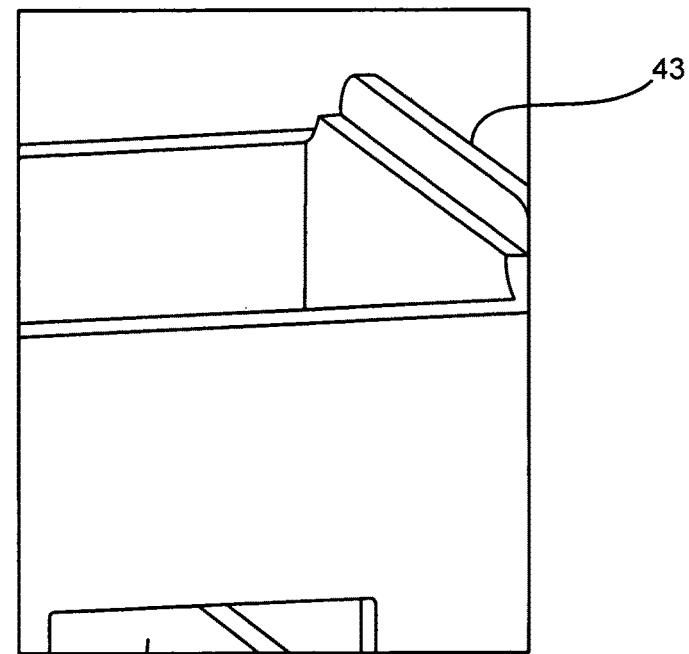
FIG. 6 is a detailed bottom rear perspective view of FIG. 1 showing a close-up of an interface protrusion.
Figure 7:
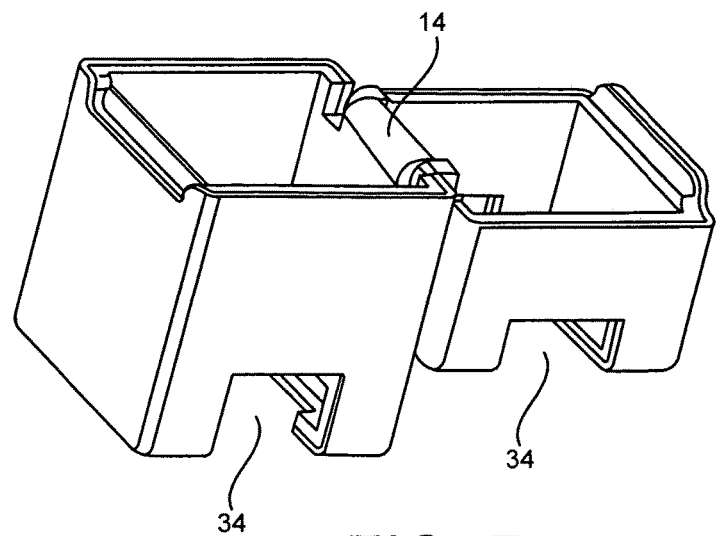
FIG. 7 is another detailed bottom perspective view of FIG. 1 showing the hinge opening.

The present invention as shown in FIG. 3, provides that the lower chamber slot 34 can provide an opening for airflow for a laptop 11, or for a tablet 10 as shown in FIG. 1. The lower chamber slot is preferably a rectangular prism like the upper chamber slot. The lower chamber slot is a cutout of the lower chamber. The lower chamber, like the upper chamber is preferably formed of a thin sheet of thermoplastic material having orthogonal sides and rounded edges. The thickness of the sidewalls of the upper chamber in the lower chamber are preferably minimized to provide minimal heat retention when the box is used in the stand mode in deployed position.

Figure 8:
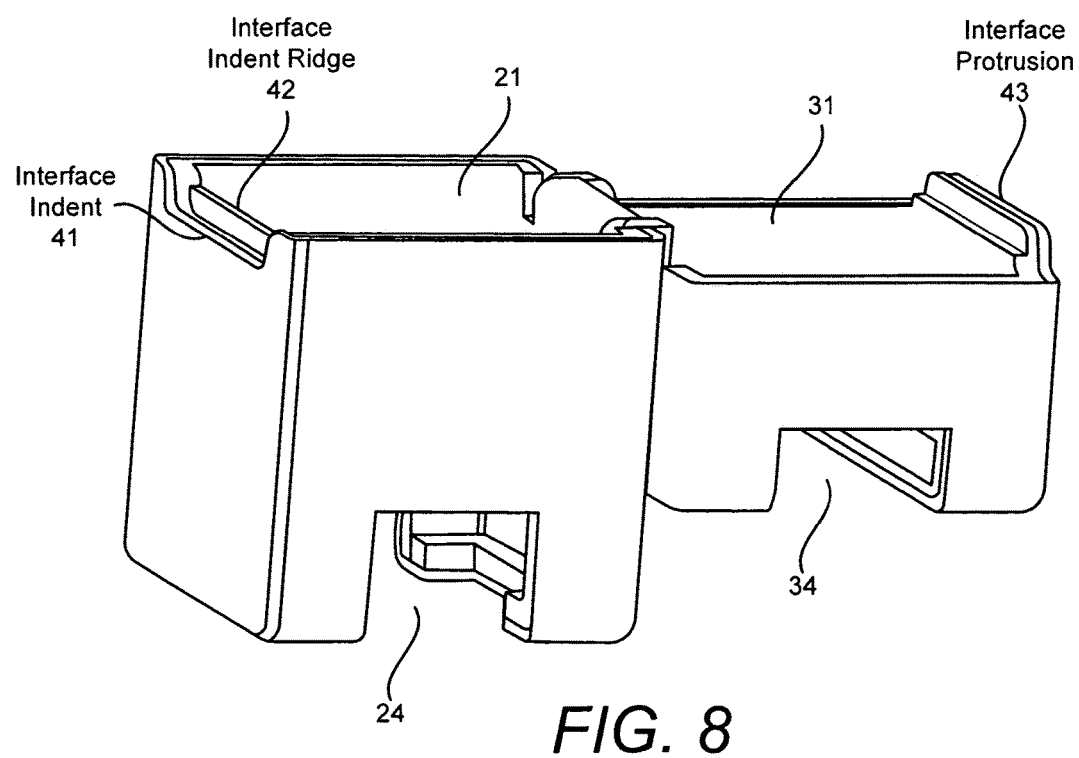
FIG. 8 is a side perspective view of FIG. 7.
Figure 9:
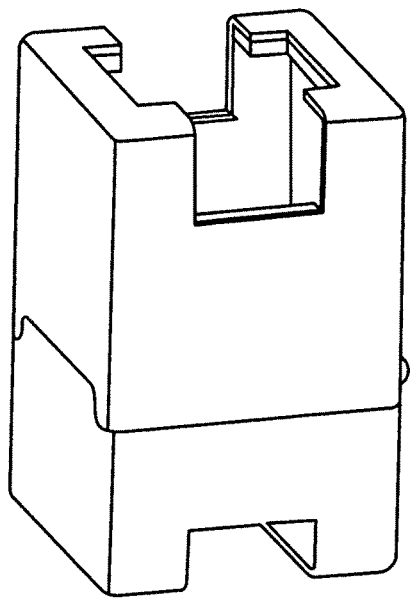
FIG. 9 is a side perspective view of the present invention.
Figure 10:
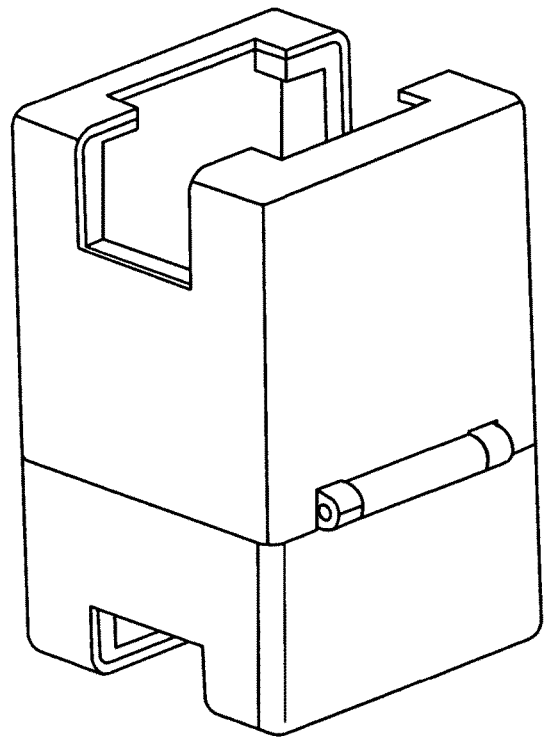
FIG. 10 is a side perspective view of the present invention in closed position.
Figure 11:
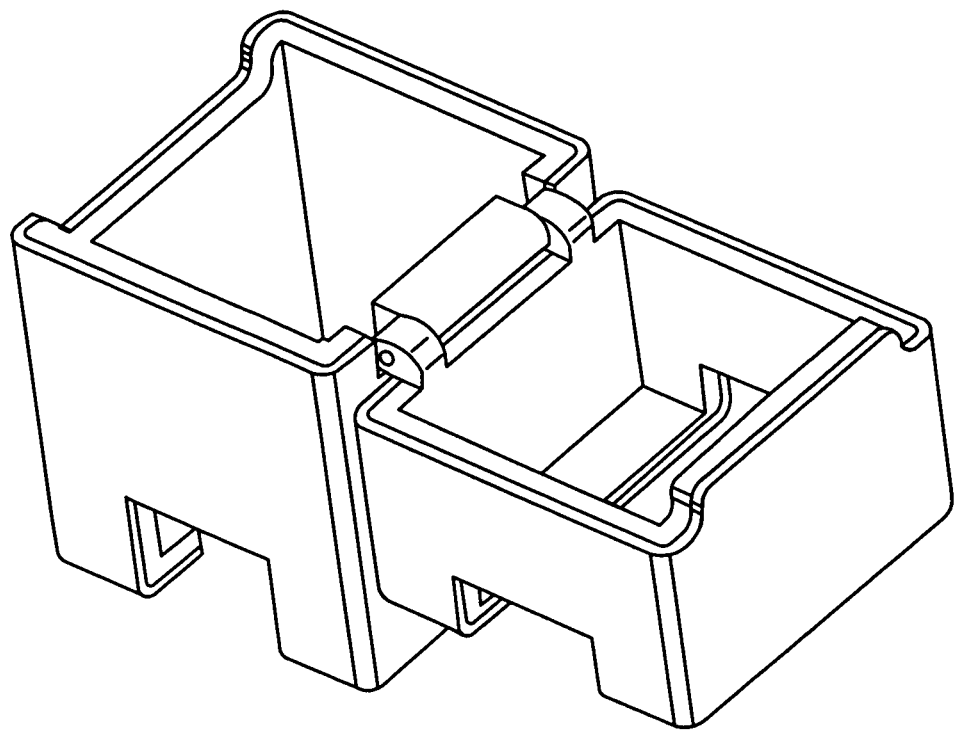
FIG. 11 is a top perspective view of the present invention in deployed open position.
Figure 12:
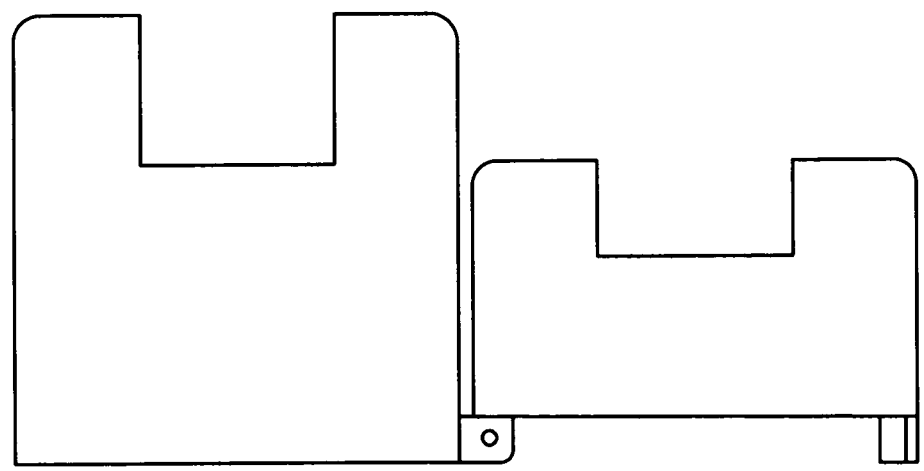
FIG. 12 is a side view of the present invention in open position.
Figure 13:
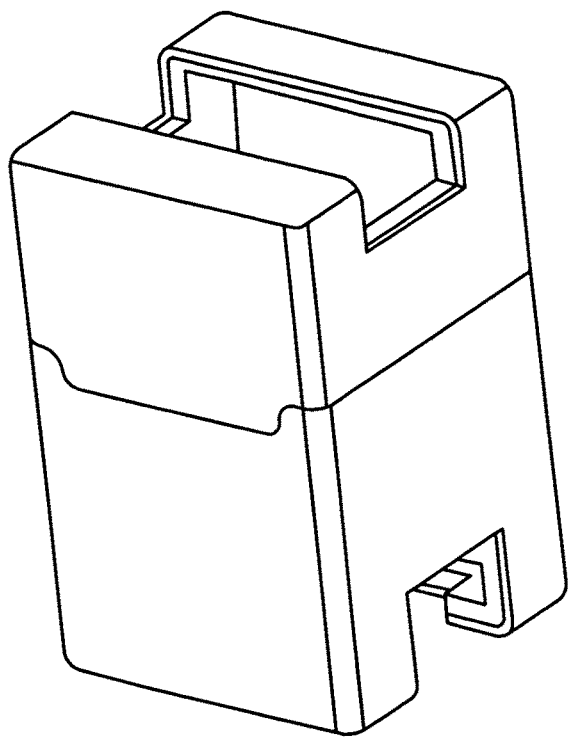
FIG. 13 is a perspective lower view of the present invention.
Figure 14:
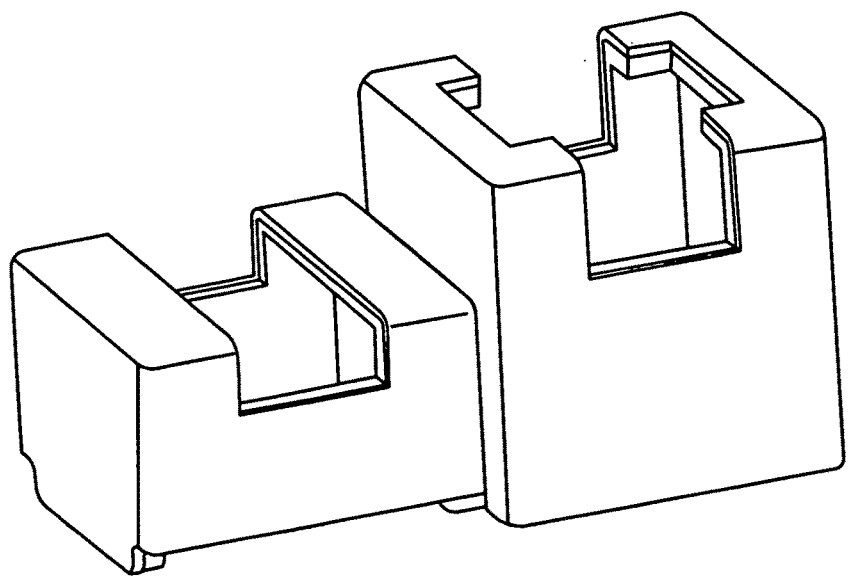
FIG. 14 is another perspective view of the present invention in open position.

Optionally as shown in FIG. 8, the lower chamber 15 can have an interface protrusion 43 that latches to an interface indent ridge 42 formed on and protruding from an interface indent 41. The interface protrusion 43 can have a snap fit that fits to the interface indent ridge 42. The interface protrusion is preferably integrally formed with the inside wall of the lower chamber. The interface protrusion preferably has a straight edge to match the straight edge of the interface indent ridge 42.

A user operates the box stand 12 as a container for holding articles such as a power supply and power cord of a personal electronic device. The user can place a power supply in the upper chamber hollow 21. The upper chamber hollow 21 communicates and is contiguous with the lower chamber hollow and together can hold a power supply in the closed position. In the closed position, the pair of slots namely the lower chamber slot 34 and the upper chamber slot 24 cooperate to form a spool for receiving a cable or cord that extends from the power supply. The cable or cord can be detachable from the power supply. The power supply preferably fits snugly within the upper chamber hollow or the lower chamber hollow, so the geometry of the upper chamber front face 27, the lower chamber front face 37, and the upper chamber side face and the lower chamber side face are preferably sized to the dimensions of the power supply. The power supply can be removed from the box container acting as a stand 12. The stand 12 may have an interface protrusion 43 that forms a footing for supporting a tablet 10 in an inclined position.

The invention claimed is:

1. A box stand comprising:
   a. an upper chamber having an upper chamber hollow, wherein the upper chamber is hollow having a first upper chamber face and a second upper chamber face as well as an upper chamber front face and a pair of upper chamber side faces;
   b. a lower chamber having a lower chamber hollow, when the lower chamber has a closed position and an open position, wherein the lower chamber is at least partially detached from the upper chamber in the open position, wherein the lower chamber is rigidly attached to the upper chamber in the closed position, wherein the lower chamber hollow has a pair of lower chamber side faces as well as a lower chamber front face;
   c. a first side interface formed between the upper chamber and the lower chamber;
   d. a second side interface formed between the upper chamber and the lower chamber, wherein the second side interface opposes the first side interface;
   e. a lower chamber slot formed on the lower chamber, wherein the lower chamber slot forms a lower chamber slot edge where the lower chamber slot is contiguous with the lower chamber hollow, wherein the lower chamber slot edge is a planar edge of a lower chamber sidewall;
   f. a first lower chamber face formed on a lower surface of the lower chamber when the lower chamber is in closed position.

2. The box stand of claim 1, further including a chamber hinge that connects the upper chamber to the lower chamber.

3. The box stand of claim 1, further including a second lower chamber face formed opposite the first lower chamber face, wherein the lower chamber slot bisects the first lower chamber face and the second lower chamber face.

4. The box stand of claim 1, further including an upper chamber slot formed on an upper portion of the upper chamber, wherein the upper chamber slot forms an upper chamber slot edge where the upper chamber slot is contiguous with the upper chamber hollow.

5. The box stand of claim 1, wherein the upper chamber has an upper chamber opening form on an opposite side of the lower chamber, wherein the upper chamber opening is wider than an upper chamber slot, wherein the upper chamber opening is contiguous with the upper chamber slot.

6. The box stand of claim 1, wherein the upper chamber releasably connects with the lower chamber at a hinged connection wherein an interface indent ridge formed on an interface indent formed on the lower edge of the upper chamber abuts with an interface protrusion formed on an upper edge of the lower chamber.

7. The box stand of claim 1, further including a lower chamber opening having a rectangular or square shape that is contiguous with the lower chamber slot, and wherein the lower chamber opening is wider than the lower chamber slot to form a lower chamber slot corner wherein the lower chamber slot is contiguous with the lower chamber opening.

* * * * *